No. 761,105. PATENTED MAY 31, 1904.
N. H. ROE.
NUT LOCK.
APPLICATION FILED DEC. 29, 1903.
NO MODEL.

Witnesses
W. N. Woodson

Inventor
N. H. Roe.
By
R. S. & A. B. Lacey,
his Attorneys.

THE NORRIS PETERS CO., PHOTO-LITHO., WASHINGTON, D. C.

No. 761,105. Patented May 31, 1904.

UNITED STATES PATENT OFFICE.

NOBLE H. ROE, OF MARCELINE, MISSOURI.

NUT-LOCK.

SPECIFICATION forming part of Letters Patent No. 761,105, dated May 31, 1904.

Application filed December 29, 1903. Serial No. 187,023. (No model.)

*To all whom it may concern:*

Be it known that I, NOBLE H. ROE, a citizen of the United States, residing at Marceline, in the county of Linn and State of Missouri, have invented certain new and useful Improvements in Nut-Locks, of which the following is a specification.

This invention relates to an improved form of lock means for nuts adapted to prevent displacement of the nut from the bolt to which it is screwed due to vibration, jar, or the like.

The invention relates more particularly to specific means carried by the nut and engaging the bolt to prevent unscrewing movement of the nut.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1:
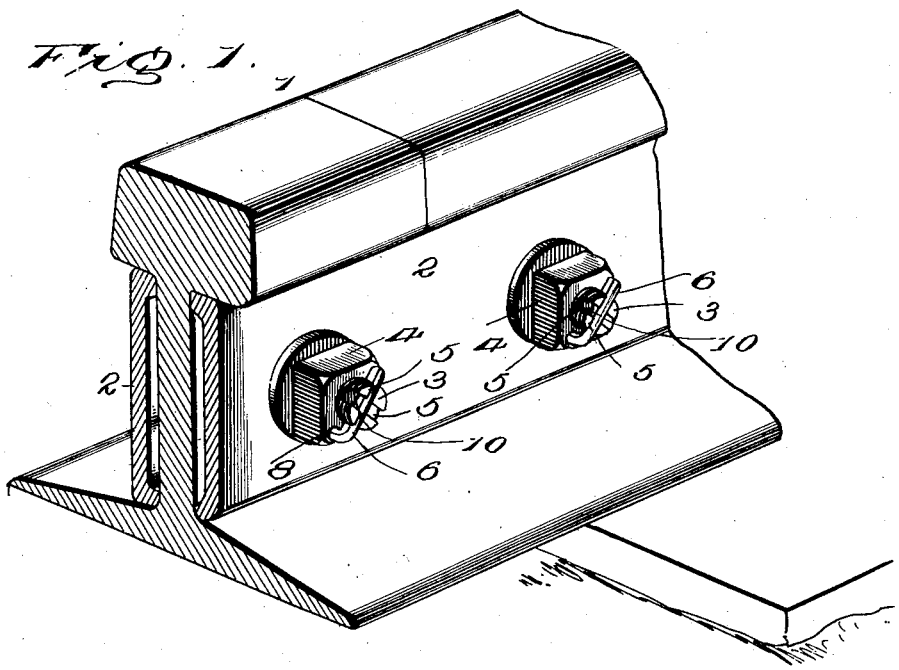
Figure 2:
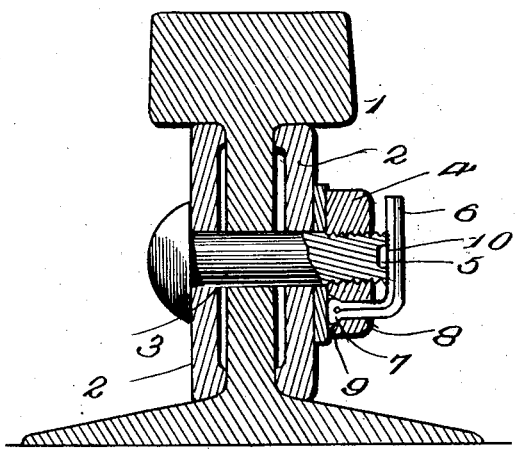
Figure 3:
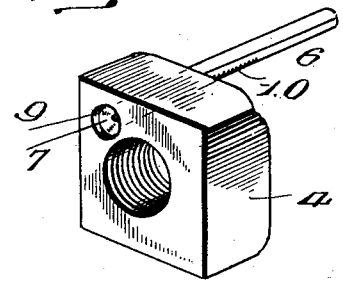

Figure 1 is a perspective view showing the application of the invention. Fig. 2 is a longitudinal sectional view through a bolt applied and a nut having the invention applied thereto. Fig. 3 is a detail perspective view of the nut, showing the lock-pin carried thereby, the serrated form of the said lock-pin being clearly shown.

Corresponding and like parts are referred to in the following description and indicated in all the views of the drawings by the same reference characters.

My invention is adapted for application to rail-joint structures, bridge structures, machinery, or otherwise where it is desirable to secure a lock means to prevent the displacement of a nut from a bolt. In the drawings the invention is shown applied to a rail-joint, the rails being designated 1, the fish-plates 2, the bolt 3, and the nut 4. The bolt or bolts pass through openings which are formed in the rail ends and the fish-plates, as usual, and the nut utilized may be of any suitable type commonly employed. The bolt 3 is of special formation, the threaded end thereof being provided with a plurality of transverse grooves 5, which extend at angles to each other and which may be provided in any number, dependent upon the size of the bolt more especially. The grooves 5 intersect each other, as will be clearly noted. The nut 4 carries the lock means which coöperates with the bolts, said lock means consisting of a pin 6, provided with a head 7, which pin passes through an opening 8 in the nut, the opening 8 being adjacent to and on a line with the threaded opening of the said nut. The head 7 of the pin 6 is seated in a recess 9 upon the under side of the nut, and is thereby disposed about flush with the under surface of the nut. The pin 6 extends outwardly from the outer face of the nut and is adapted after the nut has been screwed tightly upon the bolt to be bent at an angle, so as to engage the end of the bolt. When engaging the end of the bolt, the pin 6 rests in one of the grooves 5, and thus rigidly positions the nut from movement. In order to facilitate the gripping action of the pin against the bolt when in the engaging relation, (shown clearly in Fig. 1,) the side of the pin which is designed to engage the bolt is provided with a plurality of serrations or teeth 10, the purpose of which is obvious. When the pin 6 is bent and disposed within the grooves 5 on the end of the bolt, the serrations or teeth 10 are adapted to positively engage the grooved portion of the bolt, as will be readily comprehended. The provision of a plurality of grooves 5 is advantageous in that the lock-pin may be engaged with an ascertained one of the grooves after the nut has been properly screwed upon the bolt. The nicety of adjustment of the nut is thus secured.

Having described the invention, what is claimed as new is—

In a nut-lock, the combination with a bolt having the threaded end thereof provided with a plurality of transverse grooves, a nut provided with an opening in line with the threaded opening therein and spaced from said threaded opening, a lock-pin provided with a head at one end and having the other end extended outwardly from the nut, the extended end of the lock-pin being serrated or roughened, the extended end being bent into engagement with the grooved portion of the end of the bolt.

In testimony whereof I affix my signature in presence of two witnesses.

NOBLE H. ROE. [L. S.]

Witnesses:
J. HEMMINGS,
J. A. NICKELL.